March 3, 1964 F. W. ROESCH ETAL 3,123,243
SECTIONALIZED MOTOR CASE CONSTRUCTION
Filed July 6, 1961 2 Sheets-Sheet 1
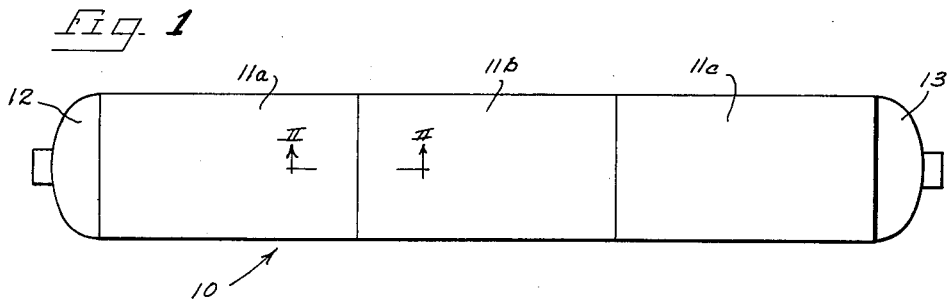
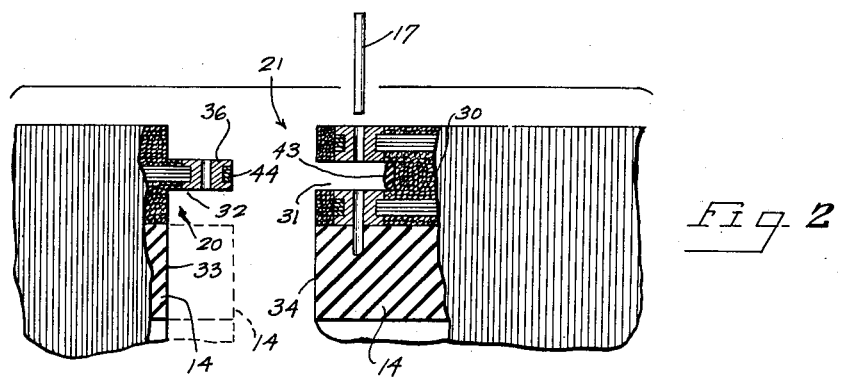
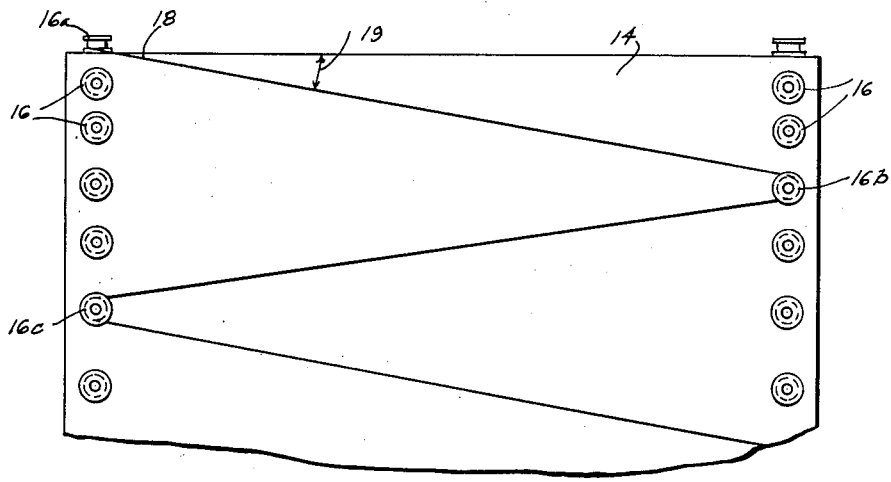
INVENTORS
Franklyn W. Roesch
BY Raymond M. Bluck
Hill, Sherman, Meroni, Gross & Simpson
ATTORNEYS March 3, 1964  F. W. ROESCH ETAL  3,123,243
SECTIONALIZED MOTOR CASE CONSTRUCTION
Filed July 6, 1961  2 Sheets-Sheet 2
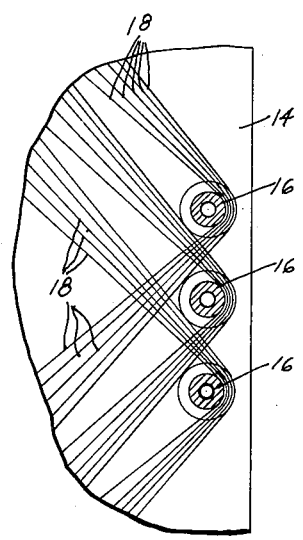
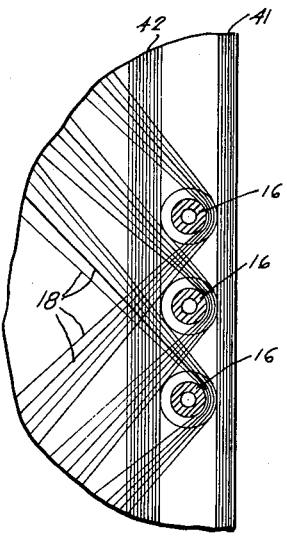
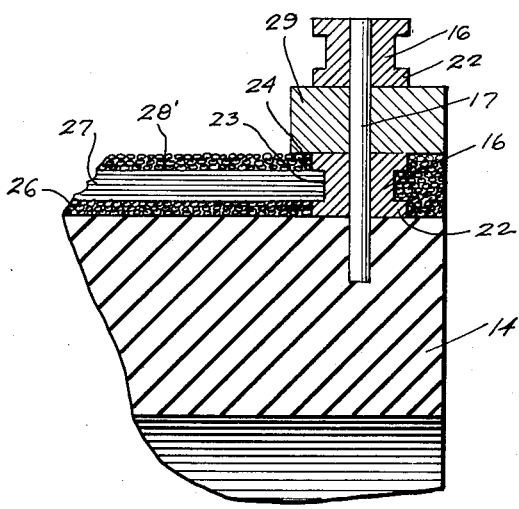
INVENTORS
Franklyn W. Roesch
BY Raymond M. Bluck
ATTORNEYS Patented Mar. 3, 1964

3,123,243
SECTIONALIZED MOTOR CASE CONSTRUCTION
Franklyn W. Roesch, Warrensville Heights, and Raymond
M. Bluck, Willowick, Ohio, assignors to Thompson
Ramo Wooldridge Inc., Cleveland, Ohio, a corporation
of Ohio
Filed July 6, 1961, Ser. No. 122,313
4 Claims. (Cl. 220—3)

This invention relates generally to pressure vessels and more particularly relates to a sectionalized motor case construction of the type utilizing a cylindrical module which is separately fabricated and which may be associated with individual end caps, as well as additional cylindrical modules, thereby to form a segmented or sectionalized motor casing construction of any desired size.

In accordance with the principles of the present invention, a winding mandrel is provided which locates an annular row of circumferentially spaced thimbles at opposite axial ends of a cylindrical section or module. Layers of filamentous material are wound on the mandrel and include longitudinal windings which extend helically between respective pairs of thimbles at opposite ends of the module. The longitudinal windings may be associated with layers of hoop windings, thereby developing the shell strength necessary to resist loading in all directions.

The opposite axial ends of the module include male and female coupling means, thereby to accommodate interfitted assembly of plural modules, or assembly of separate end caps with one or more modules to complete the motor casing construction.

The motor casing construction thus provided is characterized by joint loads which are transmitted directly to the filament windings in tension, without dependence on resin bond shear. Further, discontinuity stresses will be low, and can be controlled with extra hoop windings on either side of the joint.

Because the thimbles at opposite axial ends of the module accommodate a ready turn around of the longitudinal filamentous windings, the filaments can be laid down continuously, thereby affording optimum strength from filaments which are in tension and wherein the strength of the motor casing shell does not depend upon the resin bond.

The construction and method contemplated places no restrictions on the available winding patterns. The helical windings can be positioned to give such strength ratios as may be necessary to develop desired shell strength in one or plural sets of windings and can be biased in favor of the axial loads, while the deficit in the hoop direction is made up by a second layer of windings. Thus, an adjustment in the structural strength of the motor casing construction can be accommodated when loadings other than a direct pressure loading must be considered.

It is an object of the present invention, therefore, to provide an improved motor casing construction wherein the size of the finished product is selected by option.

Yet another object of the present invention is to provide a sectionalized motor casing construction wherein joint loads are transmitted directly to the filament windings in tension without dependence on resin bond shear.

Still a further object of the present invention is to provide a sectionalized motor case construction wherein discontinuity stresses will be low.

Many other features, advantages and additional objects of the present invention will become manifest to those versed in the art upon making reference to the detailed description which follows and the accompanying sheets of drawings, in which a preferred embodiment of a sectionalized motor case construction is illustrated by way of example and from which the methods of the present invention will become clear to those skilled in the art.

On the drawings:

FIGURE 1 is an elevational view of a sectionalized motor casing construction provided in accordance with the principles of the present invention;

FIGURE 2 is an exploded view showing the separated components of an adjoining pair of modules provided in accordance with the principles of the present invention and illustrating a section taken on line II—II of FIGURE 1;

FIGURE 3 is a fragmentary elevational view illustrating a step in the winding procedure;

FIGURES 4 and 5 are fragmentary views illustrating additional steps in the winding procedure; and FIGURE 6 is a fragmentary view showing a winding mandrel.

As shown on the drawings:

A sectionalized motor case construction in accordance with the principles of the present invention is shown generally at 10 and comprises, in this particular illustrative embodiment, three separate cylindrical modules shown at 11a, 11b and 11c, respectively.

Separately fabricated end caps are shown at 12 and 13, respectively, and are connected to the modules 11a, 11b, 11c to provide a completed motor casing construction.

To construct each individual module there is initially provided a winding mandrel upon which layers of filamentous material are placed. Although different forms of winding mandrels could be effectively utilized, one illustrative form of mandrel could take the form of a generally cylindrical rubber sleeve 14 constituting a cylindrical section and carrying at its opposite axial ends an annular row of circumferentially spaced thimbles 16. In FIGURE 6, the thimbles are shown held in place with the mandrel 14 by means of a retaining pin 17, although it will be appreciated other forms of retaining means could be utilized or, for that matter, when placed directly against the surface of the mandrel, the thimbles could be fastened to the surface of the mandrel by an appropriate adhesive.

It is contemplated, in accordance with the principles of the present invention, that each module would have layers of hoop windings and longitudinal windings placed thereon to build up the desired shell strength.

By virtue of the provision of the thimbles at opposite axial ends of each module 11, the longitudinal windings can be provided in the form of a continuously wound filament. For example, as shown in FIGURE 3, a filament 18 starts at a thimble 16a, whereupon the filament 18 advances from the one end of the mandrel 14, at which the thimble 16a is located, towards the opposite end. The filament 18 is disposed helically and the helix angle is shown at 19.

At the opposite end of the mandrel 14, the filament 18 is confined by a thimble shown at 16b, whereupon the filament 18 again is returned towards the one end of the mandrel 14 in an oppositely disposed helical manner for turn around engagement with another thimble shown at 16c. This concept offers a solution to the turn around problem at the end of the cylindrical modules since the filaments can be laid down continuously without being cut. Accordingly, optimum strength can be obtained only from the filaments in tension and not from the resin bond.

In order to couple the modules to adjoining components of the motor case construction, it is contemplated that coupling means be provided. To effect that end, such coupling means can be made as a part of the module construction. For example, as illustarted in FIGURE 2, there is a coupling construction shown which includes a male component, indicated generally at 20, and a female component indicated generally at 21. If desired, each module can be provided with a male component at one end, and a female component at the opposite end, or alternatively, modules could be provided with female joints at both ends and with male joints at both ends so that in a multiple part motor casing construction the assembly would depend upon the particular mode of coupling arrangement provided. With the same type of joint on each end of each module, the different forms of modules would have to be in adjoining relationship. With a module where a male joint is at one end and a female joint is at the opposite end, it would be necessary to arrange adjoining modules in proper mating relationship.

An illustrative form of constructing the female joint 21 is shown in FIGURE 6 wherein the thimble 16 is retained on the mandrel 14 by the pin 17. Each thimble comprises a lower flange 22, a center cylindrical section 23 and an upper flange 24. Thus, the flange 22 engages directly against the mandrel 14 and a layer of hoop windings 26 is placed on the mandrel 14 to the extent of the thickness of the flange 22. Thereafter, longitudinal windings are placed on the module, as shown at 27, to the extent of the thickness of the cylindrical section 23. Thereafter a layer of hoop windings 28 is placed on the module to the extent of the thickness of the flange 24. A spacer 29 is placed on the pin 17, whereupon the windings continue to be applied, for example, in the form of hoop windings 30 (FIGURE 2), but thereby leaving a recess 31, which is formed upon ultimate removal of the pin 17 and withdrawal of the spacer 29.

During the fabrication, the second thimble is placed on the pin 17 with its lower flange 22 engaged against the spacer 29 and the windings are alternated to build up the shell in the manner previously referred to.

To build the male joint 20, a spacer is placed directly on the mandrel 14 to provide a recess in the windings as at 32 (FIGURE 2) and that portion of the mandrel shown in dotted lines in FIGURE 2 would then be removed to form an abutment surface 33 for engaging an adjoining abutment surface 34 and with the tongue 36 constituting the male part of the joint inserted into the recess 31. The pin 17 could then be reinserted to link the male and female joints 20 and 21 in locked-together assembly.

Because of the manner of applying the longitudinal windings, discontinuity stresses are low and can be controlled with extra hoop windings on either side of the joint. For example, note in FIGURE 5 there is applied hoop windings shown at 40 and 41 on opposite axial sides of the thimbles 16.

To insure a good seal between the mating components of the coupling, a sealing member 43 may be located at the bottom of the recess 31 to be engaged by an abutment surface 44 on the end of the tongue 36.

Although minor modifications might be suggested by those versed in the art, it should be understood that we wish to embody within the scope of the patent warranted hereon all such modifications as reasonably and properly come within the scope of our contribution to the art.

We claim as our invention:

1. A motor casing comprising a cylindrical module having a row of circumferentially spaced thimbles at opposite axial ends, at least one layer of longitudinal windings of filamentous material on said module comprising a continuously wound filament threaded around said thimbles and extending helically and longitudinally on the surface of said module between each respective pair of oppositely disposed thimbles, at least one layer of hoop windings of filamentous material on said module forming with said longitudinal windings a wound cylindrical shell, and separately fabricated end caps coupled to at least one of said modules to form a unitary motor casing, one of said rows of circumferentially spaced thimbles forming together with the windings associated therewith a projecting tongue extending axially away from the end of said module and comprising the male part of a coupling connection for interfitting assembly with an adjoining female part on another component of the motor casing.

2. A cylindrical module for a modular motor casing of optional size and having separately fabricated head members forming end caps for the motor casing, said cylindrical module comprising a cylindrical mandrel member having an annular row of circumferentially spaced thimbles at opposite axial ends thereof, said module including layers of hoop windings and longitudinal windings on said mandrel, each layer of longitudinal windings comprising a continuously wound filament starting from a thimble at one end of said mandrel and extending helically to a thimble at the opposite end of said mandrel, whereupon the filament is redirected back and forth between opposite ends between respective pairs of thimbles, and coupling means at the respective ends of said module to fasten said module to one of said head members or to another module, one of said coupling means comprising an axial tongue formed by a row of said thimbles together with the windings associated therewith and comprising a male part insertable into a corresponding female part of an adjoining motor casing component.

3. A cylindrical module for a modular motor casing of optional size and having separately fabricated head members forming end caps for the motor casing, said cylindrical module comprising a cylindrical mandrel member having an annular row of circumferentially spaced thimbles at opposite axial ends thereof, said module including layers of hoop windings and longitudinal windings on said mandrel, each layer of longitudinal windings comprising a continuously wound filament starting from a thimble at one end of said mandrel and extending helically to a thimble at the opposite end of said mandrel, whereupon the filament is redirected back and forth between opposite ends between respective pairs of thimbles, and coupling means at the respective ends of said module to fasten said module at one of said head members or to another module, one of said coupling means comprising a double row of circumferentially spaced thimbles spaced apart from one another radially to form together with the windings associated therewith a recess comprising a female part receiving a corresponding male part of an adjoining motor casing component insertable therein.

4. A cylindrical module for a modular motor casing of optional size and having separately fabricated head members forming end caps for the motor casing, said cylindrical module comprising a cylindrical mandrel member having an annular row of circumferentially spaced thimbles at opposite axial ends thereof, said module including layers of hoop windings and longitudinal windings on said mandrel, each layer of longitudinal windings comprising a continuously wound filament starting from a thimble at one end of said mandrel and extending helically to a thimble at the opposite end of said mandrel, whereupon the filament is redirected back and forth between opposite ends between respective pairs of thimbles, and coupling means at the respective ends of said module to fasten said module to one of said head members or to another module, one of said coupling means comprising an axial tongue formed by a row of said thimbles together with the windings associated therewith and comprising a male part insertable into a corresponding female part of an adjoining motor casing component, the other of said coupling means comprising a double row of circumferentially spaced thimbles spaced apart from one another radially to form together with the windings associated therewith a recess for receiving a corresponding male part on an adjoining motor casing component.

References Cited in the file of this patent

UNITED STATES PATENTS

| | | |
|---|---|---|
| 1,969,540 | Bergstrom et al. | Aug. 7, 1934 |
| 2,109,529 | Goddard | Mar. 1, 1938 |
| 2,344,856 | Earle | Mar. 21, 1944 |
| 2,791,241 | Reed | May 7, 1957 |
| 2,898,940 | Cole | Aug. 11, 1959 |
| 2,964,209 | Eddy | Dec. 13, 1960 |

FOREIGN PATENTS

| | | |
|---|---|---|
| 303,791 | Great Britain | May 16, 1929 |
| 791,099 | Great Britain | Feb. 26, 1958 |